(12) United States Patent
Knight

(10) Patent No.: US 7,086,493 B2
(45) Date of Patent: Aug. 8, 2006

(54) FUEL SYSTEM COMPRISING VEHICLE IMPACT SHUTOFF

(75) Inventor: James Knight, Ypsilanti, MI (US)

(73) Assignee: Ford Motor Company, Dearborn, MI (US)

( * ) Notice: Subject to any disclaimer, the term of this patent is extended or adjusted under 35 U.S.C. 154(b) by 334 days.

(21) Appl. No.: 10/731,292

(22) Filed: Dec. 9, 2003

(65) Prior Publication Data

US 2004/0178013 A1  Sep. 16, 2004

Related U.S. Application Data

(60) Provisional application No. 60/453,585, filed on Mar. 11, 2003.

(51) Int. Cl.
*B60K 28/10* (2006.01)

(52) U.S. Cl. ............... 180/274; 180/284; 123/497

(58) Field of Classification Search ......... 180/284, 180/282, 274; 123/458, 497; 701/45
See application file for complete search history.

(56) References Cited

U.S. PATENT DOCUMENTS

| | | | |
|---|---|---|---|
| 5,044,344 A | 9/1991 | Tuckey et al. | |
| 5,237,975 A | 8/1993 | Betki et al. | |
| 5,361,742 A | 11/1994 | Briggs et al. | |
| 5,752,490 A | 5/1998 | Rodgers et al. | |
| 6,279,541 B1 | 8/2001 | Doane et al. | |
| 6,293,259 B1 | 9/2001 | Kilgore et al. | |
| 6,302,144 B1 * | 10/2001 | Graham et al. | 137/565.17 |
| 6,314,947 B1 | 11/2001 | Roche | |
| 6,318,344 B1 | 11/2001 | Lucier et al. | |
| 6,354,261 B1 * | 3/2002 | Lassiter | 123/198 D |
| 6,436,287 B1 * | 8/2002 | Fischerkeller et al. | 210/232 |
| 6,532,941 B1 | 3/2003 | Begley et al. | |
| 6,640,174 B1 * | 10/2003 | Schondorf et al. | 701/45 |
| 6,733,036 B1 * | 5/2004 | Breed et al. | 280/735 |
| 6,761,193 B1 * | 7/2004 | Cotton et al. | 141/98 |
| 6,766,235 B1 * | 7/2004 | Frimberger et al. | 701/45 |
| 6,837,222 B1 * | 1/2005 | Okazono et al. | 123/509 |
| 6,877,488 B1 * | 4/2005 | Washeleski et al. | 123/497 |
| 2001/0023683 A1 | 9/2001 | Nakamura et al. | |
| 2002/0020397 A1 | 2/2002 | Begley et al. | |
| 2002/0043253 A1 | 4/2002 | Begley et al. | |
| 2003/0221675 A1 * | 12/2003 | Washeleski et al. | 123/497 |
| 2004/0060547 A1 * | 4/2004 | Aubree et al. | 123/497 |
| 2005/0051376 A1 * | 3/2005 | Cook | 180/284 |
| 2005/0236213 A1 * | 10/2005 | Hosoya | 180/284 |

* cited by examiner

*Primary Examiner*—Paul N. Dickson
*Assistant Examiner*—Drew J. Brown
(74) *Attorney, Agent, or Firm*—Gregory P. Brown; MacMillan, Sobanski & Todd, LLC

(57) ABSTRACT

A fuel delivery system includes a fuel control module for regulating a fuel pump within a fuel tank independent of the engine control module. The fuel control module is connected to a restraint control module for receiving a signal directly therefrom in the event of vehicle impact. The fuel control module is adapted to cease fuel pump operation in response to an impact signal without requiring a signal from the engine control module.

7 Claims, 3 Drawing Sheets

FUEL SYSTEM COMPRISING VEHICLE IMPACT SHUTOFF

RELATED APPLICATIONS

The present patent document claims the benefit of the filing date under 35 U.S.C. §119(e) of provisional U.S. Patent Application Ser. No. 60/453,585, filed Mar. 11, 2003, which is hereby incorporated by reference.

TECHNICAL FIELD OF THE INVENTION

This invention relates to a fuel system for an automotive vehicle that includes a fuel control module for regulating a fuel pump. More particularly, this invention relates to such fuel system wherein the fuel control module is connected to a restraint control module for receiving a signal in the event of vehicle impact.

BACKGROUND OF THE INVENTION

In a modern automotive vehicle, an internal combustion engine is equipped with fuel injectors that spray precise quantities of fuel into an air stream en route to the combustion chamber. The fuel quantity is determined by a computer referred to as an engine control module, based upon engine operating conditions. Fuel is supplied to the engine by a fuel delivery system that typically comprises an electrical fuel pump located within a fuel tank and connected to the engine through a fuel line. The opening time for the fuel injectors is, in part, dependent upon the fuel pressure. Electronic returnless fuel systems have been developed that regulate the operation of the fuel pump to achieve a desired fuel pressure, as determined using a fuel pressure in the fuel line. Typically, the engine control module determines a projected fuel pressure, determines a duty cycle for the fuel pump based upon the difference between the projected fuel pressure and the actual fuel pressure, and provides a signal to a fuel control module, which in turn regulates power to the fuel pump to achieve the duty cycle. It would be advantageous to adapt the fuel control module to perform calculations of the duty cycle. This provides more efficient use of the fuel control module and frees resource within the engine control module for other control purposes.

Modern vehicles are also equipped with an occupant restraint system, which commonly includes an airbag. For this purpose, the vehicle is equipped with a restraint control module that is coupled to impact sensors located in the end assemblies, commonly referred to as the bumpers. When an impact is detected, the restraint control module outputs signals to inflate the airbags and also to notify the engine control module to cease engine operation. In fuel systems that rely upon the engine control module to determine operation of the fuel pump, the engine control module concurrently turns off the fuel pump. However, there is a concern that, in systems wherein fuel pump operation is determined by the fuel control module remote from the engine control module, the fuel pump may continue operation when communication from the engine control module has been disrupted because of a vehicle impact.

Therefore, a need exists for a fuel delivery system that includes a fuel control module that determines fuel pump operation and is remote from the engine control module and that turns off the fuel pump in the event of vehicle impact despite disruption of communication with the engine control module.

SUMMARY OF THE INVENTION

A fuel delivery system in accordance with this invention is adapted for use in an automotive vehicle that includes an internal combustion engine and an occupant restraint system. The fuel delivery system includes a fuel tank and an electrical fuel pump disposed within the fuel tank. The operation of the fuel pump is regulated by a fuel control module. In accordance with this invention, the fuel control module is electrically connected to the restraint control module of the occupant restraint system. In the event of a vehicle impact, the fuel control module thus receives the signal directly from the restraint control module and ceases operation of the electric fuel pump. Therefore, the fuel delivery system in accordance with this invention does not rely upon a signal from the engine control module or the like to cease operation of the fuel pump and provides enhanced reliability to assure that the fuel pump is turned off despite disruption of the communication with the engine control module as a result of the vehicle impact.

BRIEF DESCRIPTION OF THE DRAWINGS

This invention will be further illustrated with reference to the accompanying drawings wherein.

DETAILED DESCRIPTION OF THE INVENTION

Figure 1:
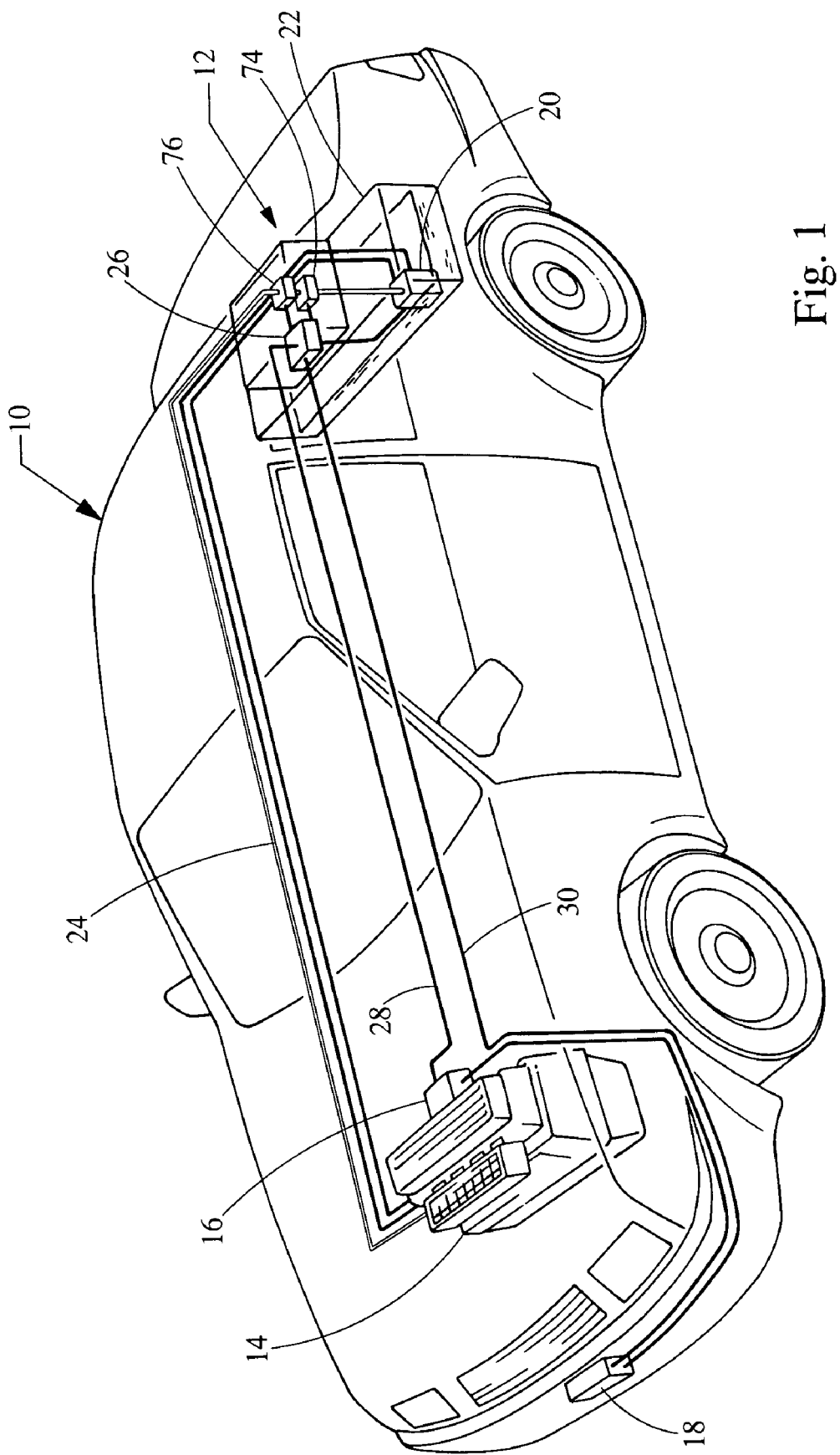
FIG. 1 is a schematic view of an automotive vehicle equipped with a fuel delivery system in accordance with a preferred embodiment of this invention.

In accordance with a preferred embodiment of this invention, referring to FIG. 1, an automotive vehicle 10 is equipped with a fuel delivery system 12 for supplying fuel to an internal combustion engine 14. Operation of engine 14 is regulated by an engine control module 16 located within the engine compartment of the vehicle. Vehicle 10 also includes passive restraint system that comprises a restraint control module 18 connected to sensors for detecting a vehicle impact. Upon detecting a vehicle impact, restraint control module 18 actuates airbags for protecting occupants of the vehicle. Also, restraint control module 18 is connected to engine control module 16 and provides a signal in response to detection of vehicle impact to cease engine operation.

Fuel delivery system 12 includes a fuel pump 20 located within a fuel tank 22 and connected to engine 14 through a fuel line 24. Fuel delivery system 12 further comprises a fuel control module 26 for regulating operation of fuel pump 20. In the preferred embodiment, fuel control module 26 is mounted on fuel tank 22 and is connected to engine control module 16, as indicated by lead 28, and also to restraint control module 18, as indicated by lead 30.

Figure 2:
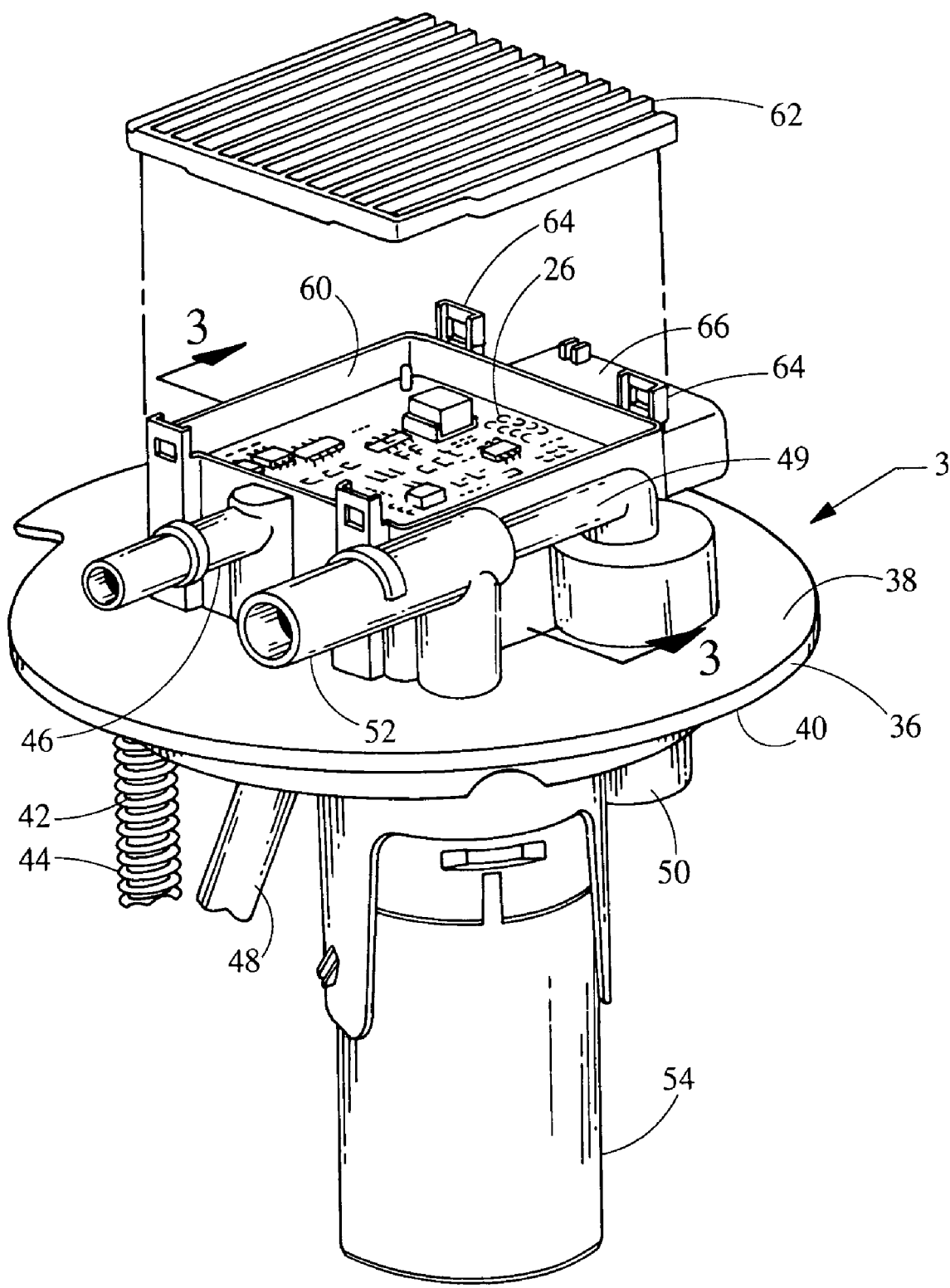
FIG. 2 is a perspective view of a fuel delivery assembly that includes a fuel control module for use in the fuel delivery system of FIG. 1.
Figure 3:
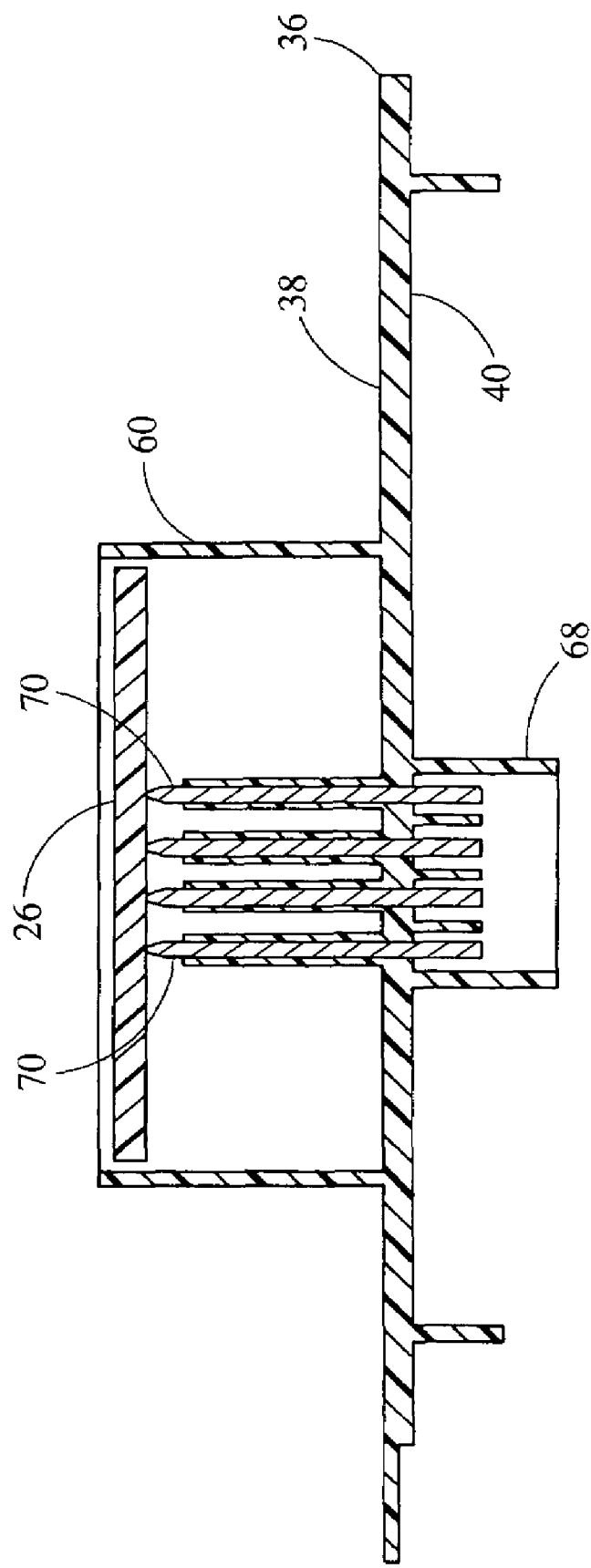
FIG. 3 is a cross-sectional view of the mounting assembly in FIG. 2, taken along line 3-3 in the direction of the arrows.

Referring now to FIGS. 2 and 3, there is depicted a fuel delivery assembly 34 for use in fuel delivery system 12. Assembly 34 includes a flange 36 that is mounted in an opening in fuel tank 22 and includes an exterior side 38 and an interior side 40. Fuel pump 20 is slidably mounted on posts 42 that are attached to interior side 40, and is biased by spring to rest against the bottom of the fuel tank. A fuel conduit 46 extends through flange 36. Conduit 46 is connected within the tank to the outlet of fuel pump 20 through a tube 48 and has an outlet connected to fuel line 24 leading to engine 14. Assembly 34 also includes a vapor vent passage 48. A gravity vent valve 50 is connected to the inlet to vapor vent passage 48, and an outlet 52 is connected to a charcoal canister that absorbs vapors. A fuel level vapor valve 54 is also connected to vapor vent passage to regulate vapor flow during tank fill.

In accordance with this invention, assembly 34 further comprises a compartment 60 disposed on the exterior side 38 of mounting plate 36 that is sized and shaped to receive fuel control module 26. Compartment 60 is closed by cover 62 secured by locking tabs 64. External electrical connections are made to assembly 34 by a wiring harness (not shown) having a plug received in socket 66 that includes terminal pins that extend through the compartment wall for connection to the module 26. Internal connections within the fuel tank, including to fuel pump 20, are made to wiring that plugs into an internal socket 68. Terminals 70 extend from internal socket 68 through flange 36 and are connected to the obverse side of fuel control module 26.

For manufacture, an integrally molded polymeric component is formed that includes flange 36, fuel conduits 46, vapor vent passage 48, compartment 60, socket 66 and internal socket 68. The pins for socket 66 and terminals 70 are integrally molded with the polymeric component. Module 26 is positioned in compartment 60, and the assembly is heated to solder terminals 70 to the control module. Cover 62 is attached to protect module 26 within the compartment.

During use, fuel control module 26 is connected to a fuel pressure sensor 74 that measures pressure within the fuel line, and to a temperature sensor 76 that measures fuel temperature within the fuel tank. In a preferred embodiment, during operation, engine control module 16 determines a precise quantity of fuel for optimum engine operation, and then determines an opening time for fuel injectors mounted in the engine to deliver the precise quantity of fuel. The opening time for the fuel injectors is, in part, based upon a projected fuel pressure within fuel line 24. Accordingly, engine control module determines a desired fuel pressure and provides a signal that is received by fuel control module 26. Alternately, fuel control module 26 may be programmed to include a predetermined value for the fuel pressure, in which case the fuel control module does not require a signal from the engine control module. The fuel control module also receives a signal from fuel pressure sensor 74 indicative of the actual fuel pressure. Fuel control module 26 compares the actual fuel pressure and the desired fuel pressure, determines the duty cycle for the fuel pump and adjusts the current duty cycle to increase or decrease the output, as necessary, to increase or decrease the fuel line pressure.

In the event of impact by the vehicle with another object, the impact is detected by sensors that communicate with restraint control module 18. Sensors may be disposed within the front end assembly for detecting a front impact, and additional sensors may be disposed within the rear end assembly for detecting a rear impact Upon detecting an impact, restraint control module 18 transmits a signal to engine control module 16 to cease engine operation. In accordance with this invention, restraint control module 18 also transmits a signal that is received by fuel control module 26 through lead 30. Lead 30 may be a dedicated wire that forms part of a wiring harness within the vehicle. Alternately, lead 30 may be a bus that connects several modules and transmits various signals detectible by individual modules. Fuel control module 26 receives the impact signal and terminates operation of fuel pump 20. This stops fuel flow to the engine to reduce risks associated with fuel spillage resulting from damage to the vehicle due to the impact.

Therefore, this invention provides a fuel delivery system wherein the fuel delivery module is programmed to regulate fuel pump operation independent of the engine control module. The module is adapted to stop fuel pump operation in response to an impact signal received directly from the restraint control module. This assures that fuel flow to the engine stops even though the fuel control module does not receive a signal from the engine control module because of damage to the engine control module or the connections therebetween due to the vehicle impact. This also prevents a situation wherein damage to the fuel line, resulting in spillage and reduced fuel pressure, might be misinterpreted by the fuel control module as requiring an increased fuel pump operation. Thus, the invention provides increased safety for the occupants of the vehicle following impact.

While this invention has been disclosed in terms of certain embodiments thereof, it is not intended to be so limited, but rather only to the extent set forth in the claims that follow.

The invention claimed is:

1. In an automotive vehicle comprising an internal combustion engine and an occupant restraint system that includes a restraint control module for detecting vehicle impact, a fuel delivery system comprising:
   a fuel tank having an opening;
   an electrical fuel pump disposed within the fuel tank for supplying fuel to said internal combustion engine;
   a flange assembly closing said opening; and
   a fuel control module mounted in the flange assembly and electrically connected to the electrical fuel pump for regulating operation thereof, further wherein said fuel control module is electrically connected to said restraint control module for receiving a signal indicative of a vehicle impact directly therefrom and adapted to cease operation of said electrical fuel pump in response to said signal.

2. The fuel delivery system of claim 1 wherein the fuel delivery system is an electronic returnless fuel system.

3. The fuel delivery system of claim 1 wherein the electrical fuel pump has a duty cycle that determines a fuel flow rate to said internal combustion engine, and wherein the fuel control module is adapted to regulate the duty cycle.

4. In an automotive vehicle comprising an internal combustion engine, an engine control module for regulating operation of the internal combustion engine, and an occupant restraint system that includes a restraint control module for providing a signal indicative of a vehicle impact, an electronic returnless fuel system comprising:
   a fuel tank having an opening;
   a fuel pump disposed in the fuel tank and having a duty cycle;
   a flange assembly closing said opening; and
   a fuel control module mounted in the flange assembly and electrically connected to the fuel pump, said fuel control module being electrically connected to the engine control module for regulating the duty cycle of the fuel pump in response to engine operating conditions, and further wherein the fuel control module is electrically connected to the restraint control module to receive the signal directly therefrom and adapted to cease operation of said electrical fuel pump in response thereto.

5. The electronic returnless fuel system of claim 4 wherein the flange assembly comprises a flange and an external compartment formed on said flange outboard said fuel tank, and wherein the fuel control module is disposed within the external compartment.

6. The electronic returnless fuel system of claim 4 wherein the flange assembly comprises a conduit coupled to the electrical fuel pump and to a fuel line connected to the internal combustion engine.

7. The electronic returnless fuel system of claim 6 wherein the flange assembly comprises a fuel pressure sensor electrically connected to said fuel control module.

* * * * *